United States Patent
Shirotani et al.

(10) Patent No.: US 10,400,372 B2
(45) Date of Patent: Sep. 3, 2019

(54) ELECTRICALLY CHARGED NONWOVEN FABRIC, FILTRATION MATERIAL INCLUDING SAME, AND METHOD FOR PRODUCING ELECTRICALLY CHARGED NONWOVEN FABRIC

(71) Applicant: KURARAY CO., LTD., Kurashiki-shi (JP)

(72) Inventors: Yasuhiro Shirotani, Saijo (JP); Ikuhisa Shiraishi, Saijo (JP)

(73) Assignee: KURARAY CO., LTD., Kurashiki-shi (JP)

( * ) Notice: Subject to any disclaimer, the term of this patent is extended or adjusted under 35 U.S.C. 154(b) by 116 days.

(21) Appl. No.: 15/522,506

(22) PCT Filed: Oct. 26, 2015

(86) PCT No.: PCT/JP2015/080140
§ 371 (c)(1),
(2) Date: Apr. 27, 2017

(87) PCT Pub. No.: WO2016/068090
PCT Pub. Date: May 6, 2016

(65) Prior Publication Data
US 2017/0350049 A1  Dec. 7, 2017

(30) Foreign Application Priority Data

Oct. 28, 2014 (JP) .................. 2014-219402
Oct. 28, 2014 (JP) .................. 2014-219405

(51) Int. Cl.
*D04H 3/009* (2012.01)
*D04H 1/4326* (2012.01)
*D04H 3/16* (2006.01)
*B01D 39/08* (2006.01)
*B03C 3/28* (2006.01)
*B01D 39/16* (2006.01)

(52) U.S. Cl.
CPC .......... *D04H 3/009* (2013.01); *B01D 39/083* (2013.01); *B01D 39/1623* (2013.01); *B03C 3/28* (2013.01); *D04H 1/4326* (2013.01); *D04H 3/16* (2013.01); *B01D 2239/0435* (2013.01); *B01D 2239/0622* (2013.01); *B01D 2239/1233* (2013.01); *D06M 2200/30* (2013.01)

(58) Field of Classification Search
CPC .... B01D 2239/0435; B01D 2239/0622; B01D 2239/1233; B01D 39/083; B01D 39/1623; B03C 3/28; D04H 1/4326; D04H 3/009; D04H 3/16; D04H 2200/30; D04H 1/54; D04H 1/551; D04H 1/56; D01F 6/74
See application file for complete search history.

(56) References Cited

U.S. PATENT DOCUMENTS

| | | | |
|---|---|---|---|
| 4,547,420 | A | 10/1985 | Krueger et al. |
| 2009/0324895 | A1 | 12/2009 | Takano et al. |
| 2011/0151737 | A1 | 6/2011 | Moore et al. |
| 2011/0168024 | A1 | 7/2011 | Veeser et al. |
| 2015/0140306 | A1 | 5/2015 | Endo et al. |
| 2017/0350049 | A1 | 12/2017 | Shirotani et al. |

FOREIGN PATENT DOCUMENTS

| | | |
|---|---|---|
| CN | 103933785 A | 7/2014 |
| CN | 107109733 A | 8/2017 |
| EP | 0 138 549 A2 | 4/1985 |
| EP | 0 138 549 B1 | 12/1989 |
| JP | 10-245772 A | 9/1998 |
| JP | 2001-210549 A | 8/2001 |
| JP | 2008-221074 A | 9/2008 |
| JP | 2009-119327 A | 6/2009 |
| JP | 2009-226321 A | 10/2009 |
| JP | 2009-228152 A | 10/2009 |
| JP | 2010-501663 A | 1/2010 |
| JP | 2010-90512 A | 4/2010 |
| JP | 2011-183236 A | 9/2011 |
| JP | 2012-224946 A | 11/2012 |
| JP | 2013-515175 A | 5/2013 |

(Continued)

OTHER PUBLICATIONS

Extended European Search Report dated May 4, 2018 in European Patent Application No. 15855828.8, 6 pages.

(Continued)

*Primary Examiner* — Arti Singh-Pandey
(74) *Attorney, Agent, or Firm* — Oblon, McClelland, Maier & Neustadt, L.L.P.

(57) ABSTRACT

Use of an electrically charged nonwoven fabric that is made of a fiber predominantly composed of an amorphous polymer provides a novel filtration material having improved performance compared to that of conventional filtration materials, and having excellent heat resistance and excellent flame retardancy as well as an electrically charged nonwoven fabric for use in the filtration material. It is preferable that the surface charge density is greater than or equal to $1 \times 10^{-10}$ coulomb/cm$^2$. It is preferable that the collection efficiency for collecting a dust particle with a particle diameter of 1 μm flowing at a fabric-passing velocity of 8.6 cm/second is greater than or equal to 40%, the QF value is greater than or equal to 0.05, and the decrement of the dust-particle collection efficiency after being allowed to leave at 100° C. for 24 hours is less than or equal to 10%.

16 Claims, No Drawings

(56) References Cited

FOREIGN PATENT DOCUMENTS

TW    201408966 A    3/2014
TW    201413084 A    4/2014

OTHER PUBLICATIONS

International Search Report dated Jan. 12, 2016, in PCT/JP2015/080140, filed Oct. 26, 2015.
Combined Office Action and Search Report dated Sep. 3, 2018 in Chinese Patent Application No. 201580059007.3, 22 pages (with English translation).
Combined Office Action and Search Report dated Feb. 21, 2018 in Taiwanese Patent Application No. 104135433 with English translation, 8 pages.
Office Action dated May 21, 2019, in Japanese Patent Application No. 2016-556563 (w/ English translation).

ELECTRICALLY CHARGED NONWOVEN FABRIC, FILTRATION MATERIAL INCLUDING SAME, AND METHOD FOR PRODUCING ELECTRICALLY CHARGED NONWOVEN FABRIC

TECHNICAL FIELD

The present invention relates to an electrically charged nonwoven fabric with excellent heat resistance and excellent flame retardancy, a method for producing the same, and a filtration material with excellent heat resistance and excellent flame retardancy containing the electrically charged nonwoven fabric.

BACKGROUND ART

Conventionally, as filters for applications such as masks and air conditioning, electrically charged (electret) nonwoven fabrics have been typically used, which are nonwoven fabrics formed of polypropylene fiber electrically charged by a method such as the corona discharge method or the hydro-charging method. These electrically charged nonwoven fabrics including polypropylene fiber, however, are poorly heat resistant. Therefore, these electrically charged nonwoven fabrics are unsuitable for various exhaust gas filters and filtration materials (heat-resistant filters) used in heat-resistance-requiring applications such as collection and removal of high-temperature dust and the like discharged from diesel engines and the like.

It is known that a nonwoven fabric including heat-resistant fiber is conventionally used as a heat-resistant filter for such heat-resistance-requiring applications. For example, Japanese Patent Laying-Open No. 2009-119327 (PTD 1) discloses a lightweight heat-resistant filter including a nonwoven fabric that contains heat-resistant short fiber such as aramid fiber, polyether ether ketone fiber, polyimide fiber, PPS fiber, polytetrafluoroethylene fiber, polyester fiber, nylon 66 fiber, or phenol fiber. According to Japanese Patent Laying-Open No. 2011-183236 (PTD 2), a heat-resistant filter including a heat-resistant fiber such as polyphenylene sulfide fiber, meta-aramid fiber, para-aramid fiber, polyamide-imide fiber, or polyimide fiber is also known.

Japanese Patent Laying-Open No. 2010-90512 (PTD 3) discloses a layered structure composed of two or more layers for use as a filtration material for a filter. The layered structure consists of a super-ultrafine-fiber layer that has a fibrous structure including super ultrafine fiber of wholly aromatic polyamide or the like and a nonwoven-fabric layer including thermoplastic fiber of polyphenylene sulfide, polyether ether ketone, polyether ketone, a thermoplastic polyimide, or the like. These layers are bonded together by thermocompression bonding at respective areas thereof having a linear, corrugated, or zigzag shape, and are thereby formed into a single component. According to the description of PTD 3, this layered structure has excellent collection efficiency owing to the super-ultrafine-fiber layer and also has very low pressure loss, so that it is suitable for use as a heat-resistant filter for removing hazardous substances in gases discharged from iron factories, thermal power stations, garbage incinerators, and coal boilers, for example.

Heat-resistant filters including glass fiber, and the like have also been widely known. However, the heat-resistant filters of this type have poor handleability because they have great specific gravity (weight) and they cause irritation to skin due to scattered fibers. In addition, the heat-resistant filters of this type cause waste treatment problems.

Therefore, there has been a demand for development of a novel filtration material having improved performances although various heat-resistant filters have been conventionally known as described above.

CITATION LIST

Patent Document

PTD 1: Japanese Patent Laying-Open No. 2009-119327
PTD 2: Japanese Patent Laying-Open No. 2011-183236
PTD 3: Japanese Patent Laying-Open No. 2010-90512

SUMMARY OF INVENTION

Technical Problems

The present invention has been devised so as to solve the problems described above. An object of the present invention is to provide a novel filtration material having improved performances (specifically, low pressure loss and excellent collection efficiency) compared to those of conventional filtration materials and also having excellent heat resistance and excellent flame retardancy, as well as a nonwoven fabric for use in the filtration material.

Solutions to Problems

Electret charging is known as a technique for imparting excellent collection efficiency to nonwoven fabric. Electret processing has been applied to nonwoven fabrics that include primarily polyolefin polymers such as polypropylene. When applied to nonwoven fabrics made of other resins, electret processing can achieve high electric charge but, as it is known, the resulting high electric charge typically has a short life particularly under high-temperature conditions.

The inventors of the present invention have conducted intensive research to solve these problems. As a result, they have found that when electret processing is conducted by at least one method of a corona discharge method and a hydro-charging method, the resulting nonwoven fabric, particularly one made of an amorphous polymer, has low pressure loss and excellent collection efficiency that last long even under high-temperature conditions. Thus, the present invention has now been completed.

Specifically, the present invention provides the following.

An electrically charged nonwoven fabric of the present invention includes a fiber predominantly composed of an amorphous polymer.

Preferably, the electrically charged nonwoven fabric of the present invention has a surface charge density of greater than or equal to $1 \times 10^{-10}$ coulomb/cm$^2$.

Preferably, the electrically charged nonwoven fabric of the present invention has a collection efficiency for collecting a dust particle with a particle diameter of 1 μm flowing at a fabric-passing velocity of 8.6 cm/second of greater than or equal to 40%, a QF value of greater than or equal to 0.05, and a decrement of the dust-particle collection efficiency after being allowed to leave at 100° C. for 24 hours of less than or equal to 10%. Further preferably, the QF value is greater than or equal to 0.1 and the decrement of the dust-particle collection efficiency after being allowed to leave at 100° C. for 24 hours is less than or equal to 20%.

Preferably, the amorphous polymer in the electrically charged nonwoven fabric of the present invention has a glass transition temperature of greater than or equal to 200° C.

Preferably, the amorphous polymer in the electrically charged nonwoven fabric of the present invention is an amorphous polyetherimide.

Preferably, the electrically charged nonwoven fabric of the present invention is made of a fiber having an average fiber diameter of 1 to 25 μm.

Preferably, the electrically charged nonwoven fabric of the present invention has a thickness within the range from 10 to 1000 μm.

Preferably, the electrically charged nonwoven fabric of the present invention is produced by a melt blown method or a spunbonding method. More preferably, the electrically charged nonwoven fabric of the present invention is produced by electrical charging conducted by at least one method of a corona discharge method and a hydro-charging method.

The present invention also provides a filtration material including the electrically charged nonwoven fabric described above.

The present invention also provides a method for producing an electrically charged nonwoven fabric, comprising:

forming a nonwoven fabric by a melt blown method or a spunbonding method using a fiber predominantly composed of an amorphous polymer; and electrically charging the resulting nonwoven fabric by at least one method of a corona discharge method and a hydro-charging method.

Advantageous Effects of Invention

The present invention provides a filtration material having improved performances (specifically, low pressure loss and excellent collection efficiency) compared to those of conventional filtration materials, having excellent heat resistance and excellent flame retardancy, being easy to handle, and hardly causing waste treatment problems; an electrically charged nonwoven fabric for use to produce the filtration material; and a method for producing the electrically charged nonwoven fabric.

DESCRIPTION OF EMBODIMENTS

An electrically charged (electret) nonwoven fabric of the present invention is formed by using a fiber predominantly composed of an amorphous polymer. The term "electrically charged" refers to a state of a nonwoven fabric carrying an electric charge. The surface charge density of the electrically charged nonwoven fabric of the present invention (a value obtained by measuring an amount of electric charge with a Faraday cage [static meter] and then dividing the resulting measurement by the area) is preferably greater than or equal to $1.0 \times 10^{-10}$ coulomb/cm$^2$, more preferably greater than or equal to $1.5 \times 10^{-10}$ coulomb/cm$^2$, further preferably greater than or equal to $2.0 \times 10^{-10}$ coulomb/cm$^2$.

Examples of the amorphous polymer in the present invention include amorphous polyetherimides (glass transition temperature, 215° C.), amorphous polystyrenes (glass transition temperature, 100° C.), amorphous polycarbonates (glass transition temperature, 150° C.), amorphous polyether sulfones (glass transition temperature, 225° C.), amorphous polyamide-imides (glass transition temperature, 275° C.), amorphous modified polyphenylene ethers (glass transition temperature, 210° C.), amorphous polysulfones (glass transition temperature, 190° C.), and amorphous polyarylates (glass transition temperature, 193° C.). The "amorphous" state of the polymer can be identified by observing an endothermic peak of a fiber derived from the polymer during measurement with a differential scanning calorimeter (DSC) in nitrogen with the temperature being raised at a rate of 10° C./minute. A very broad, non-distinct endothermic peak, which has no problem in practical use, can also be regarded as indicating an amorphous state in practical use.

The electrically charged nonwoven fabric of the present invention formed by using a fiber predominantly composed of an amorphous polymer of this type is preferably used to prepare a filtration material having improved performances compared to those of conventional filtration materials (as described below), having excellent heat resistance and excellent flame retardancy, being easy to handle, and hardly causing waste treatment problems.

The fiber predominantly composed of an amorphous polymer preferably contains the amorphous polymer in an amount of greater than or equal to 50% by weight, more preferably in an amount within the range from 80 to 100% by weight, further preferably in an amount within the range from 90 to 100% by weight. The fiber included in the electrically charged nonwoven fabric of the present invention may further contain a component other than the amorphous polymer, as long as the effects of the present invention are not impaired, and examples of the component other than the amorphous polymer include polypropylenes, polyesters, polyamides, liquid crystal polymers, and various additives (described below). Of course, the electrically charged nonwoven fabric of the present invention may further contain a fiber other than the fiber predominantly composed of an amorphous polymer, as long as the effects of the present invention are not impaired, and examples of the fiber other than the fiber predominantly composed of an amorphous polymer include nonconductive fibers (described below) and glass fiber.

The glass transition temperature (Tg) of the amorphous polymer contained in the electrically charged nonwoven fabric of the present invention is preferably greater than or equal to 200° C., preferably within the range from 205 to 300° C. In the case that the glass transition temperature of the amorphous polymer is less than 200° C., there is a tendency that the electrically charged state does not last. An amorphous polyetherimide (PEI) is preferably used as the amorphous polymer from the viewpoint that the electrically charged state lasts and that heat resistance of the resulting nonwoven fabric improves as the glass transition temperature increases. However, in the case that the glass transition temperature is too high, the temperature for fusion is also high and thereby the polymer can degrade upon fusion. For this reason, the glass transition temperature is more preferably from 200 to 230° C., further preferably from 205 to 220° C.

The amorphous polymer in the present invention is preferably an amorphous PEI, among all the amorphous polymers described above, for its excellent heat resistance, excellent flame retardancy, and excellent heat-fusion characteristics (workability). As the amorphous PEI, a polymer of the following general formula is preferably used. In the formula, R1 is a $C_{6-30}$ divalent aromatic residue and R2 is a divalent organic group selected from the group consisting of $C_{6-30}$ divalent aromatic residues, $C_{2-20}$ alkylene groups, $C_{2-20}$ cycloalkylene groups, and polydiorganosiloxane groups with its chain terminated with a $C_{2-8}$ alkylene group.

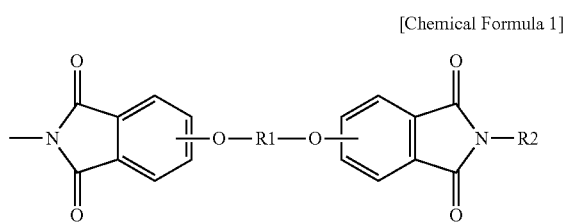

[Chemical Formula 1]

The fiber predominantly composed of an amorphous polymer, among all fibers constituting the nonwoven fabric of the present invention, preferably has an average fiber diameter ranging from 1 to 25 µm. In the case that the average fiber diameter of this fiber constituting the electrically charged nonwoven fabric is less than 1 µm, cotton fly may form or web formation may be difficult to proceed. An average fiber diameter thereof that is greater than 25 µm may be unpreferable from the viewpoint of denseness. The average fiber diameter is more preferably from 1.2 to 15 µm, further preferably from 1.5 to 10 µm.

The molecular weight of the amorphous PEI is not particularly limited. In consideration of mechanical performances and dimensional stability of the resulting fiber and the resulting nonwoven fabric as well as ease of conducting production steps, however, the weight average molecular weight (Mw) of the amorphous PEI is preferably from 1000 to 80000. A high molecular weight is preferable because the resulting performances such as fiber strength and heat resistance are excellent. From the viewpoint of costs for resin production and fiber formation and the like, however, the weight average molecular weight is preferably from 2000 to 50000, more preferably from 3000 to 40000.

From the viewpoint of the amorphous degree, melt formability, and costs, the amorphous PEI in the present invention is preferably a condensate of 2,2-bis[4-(2,3-dicarboxyphenoxy)phenyl]propane dianhydride and m-phenylenediamine or p-phenylenediamine predominantly having a structural unit of the following formula. The PEI of this type is commercially available under trademark "Ultem" from SABIC Innovative Plastics.

The amorphous PEI may contain in its main chain a structural unit other than a cyclic imide or an ether bond, such as an aliphatic, alicyclic, or aromatic ester unit or an oxycarbonyl unit, as long as the effects of the present invention are not impaired.

The fiber predominantly composed of an amorphous polymer constituting the electrically charged nonwoven fabric of the present invention may further contain an antioxidant, an antistatic agent, a radical inhibitor, a delustering agent, an ultraviolet absorber, a flame retardant, an inorganic substance, or the like, as long as the effects of the present invention are not impaired. Specific examples of the inorganic substance include carbon nanotube, fullerene, silicates such as talc, wollastonite, zeolite, sericite, mica, kaolin, clay, pyrophyllite, silica, bentonite, and alumina silicate, silicon oxide, metal oxides such as magnesium oxide, alumina, zirconium oxide, titanium oxide, and iron oxide, carbonates such as calcium carbonate, magnesium carbonate, and dolomite, sulfates such as calcium sulfate and barium sulfate, hydroxides such as calcium hydroxide, magnesium hydroxide, and aluminum hydroxide, glass beads, glass flakes, glass powder, ceramic beads, boron nitride, silicon carbide, carbon black, and graphite. For improving hydrolysis resistance of the fiber, an end-capping agent such as a mono- or diepoxy compound, a mono- or polycarbodiimide compound, a mono- or dioxazoline compound, or a mono- or diazirine compound may further be contained.

The basis weight of the electrically charged nonwoven fabric is not particularly limited, but is preferably from 1 to 1000 $g/m^2$. In the case that the basis weight of the electrically charged nonwoven fabric is less than 1 $g/m^2$, tenacity may be low, which potentially causes breakage during processing. A basis weight of the electrically charged nonwoven fabric of greater than 1000 $g/m^2$ is unpreferable from the viewpoint of productivity. The basis weight of the electrically charged nonwoven fabric is more preferably from 2 to 950 $g/m^2$, further preferably from 3 to 900 $g/m^2$.

The air permeability of the electrically charged nonwoven fabric of the present invention is not particularly limited, but is preferably within the range from 1 to 300 $cc/cm^2/sec$, more preferably within the range from 10 to 250 $cc/cm^2/sec$, further preferably within the range from 50 to 200 $cc/cm^2/sec$. In the case that the air permeability of the electrically charged nonwoven fabric is less than 1 $cc/cm^2/sec$, an air permeability property is poor and a filter made of this nonwoven fabric readily tends to clog. In the case that the air permeability of the electrically charged nonwoven fabric is greater than 300 $cc/cm^2/sec$, fiber density greatly varies and thereby performances of a filter made of this nonwoven fabric tend to vary.

The density of the electrically charged nonwoven fabric of the present invention is not particularly limited, but is preferably within the range from 0.05 to 0.30 $g/cm^3$, more preferably within the range from 0.10 to 0.25 $g/cm^3$. In the case that the density of the electrically charged nonwoven fabric is within this range, the electrically charged nonwoven fabric can retain both the configuration and the characteristics preferable for a nonwoven fabric, tends to have desired performances such as air permeability property, and tends to have low pressure loss (described below) and excellent collection efficiency despite its thin profile.

The electrically charged nonwoven fabric of the present invention can be suitably used as a filtration material, particularly as a filtration material for use in applications that require heat resistance, as described below. Thus, the present invention also provides a filtration material including the electrically charged nonwoven fabric of the present

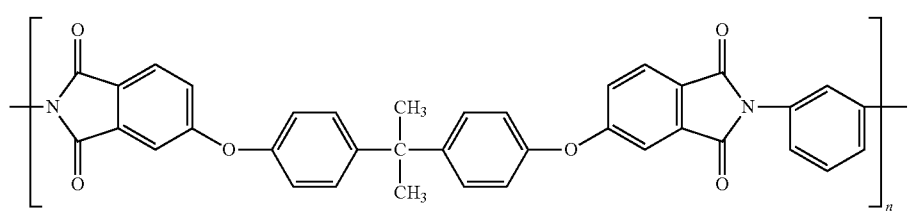

[Chemical Formula 2]

invention. It is important for a filtration material to have a good balance between its collection efficiency and its pressure loss. The electrically charged nonwoven fabric of the present invention, which is electrically charged in the way described above, can have low pressure loss and excellent collection efficiency despite its thin profile. The thickness of the electrically charged nonwoven fabric of the present invention is not limited, but can be as small as preferably within the range from 10 to 1000 μm, more preferably within the range from 100 to 500 μm, to achieve excellent collection efficiency.

The electrically charged nonwoven fabric of the present invention gives a filtration material having the following excellent performances:

(1) a collection efficiency for collecting a quartz dust particle with a particle diameter of 1 μm flowing at a fabric-passing velocity of 8.6 cm/second of greater than or equal to 40%;

(2) a QF value of greater than or equal to 0.05; and (3) a decrement of the dust-particle collection efficiency after being allowed to leave at 100° C. for 24 hours of less than or equal to 10%.

The numerical value of collection efficiency of the filtration material in (1), which can be measured in accordance with the standard of JIS T 8151, is more preferably greater than or equal to 50%, further preferably greater than or equal to 80%.

The QF (Quality Factor) value in (2) calculated by using expression $-\ln(1-(\text{collection efficiency (\%)})/100)/(\text{pressure loss (Pa)})$ is preferably greater than or equal to 0.10, more preferably greater than or equal to 0.12. The pressure loss can be measured in accordance with the standard of JIS T 8151. The greater the QF value is, the better the balance between collection efficiency and pressure loss.

The smaller the decrement of the dust-particle collection efficiency after being allowed to leave at 100° C. for 24 hours in (3) is, the less likely the collection efficiency is to decrease in a high-temperature environment, namely the more suitably the filtration material (filter) can be used in an environment requiring heat resistance because its collection efficiency does not decrease. In a filtration material having a low QF value at room temperature, the dust-particle collection efficiency tends not to decrease in a high-temperature environment (there is not much room for a decrease). In the present invention, however, requirement (2) above excludes a filtration material having a low QF value at room temperature. The decrement of the dust-particle collection efficiency after being allowed to leave at 100° C. for 24 hours is preferably less than or equal to 20%, more preferably less than or equal to 10%.

In the electrically charged nonwoven fabric of the present invention, formation of the fiber predominantly composed of an amorphous polymer into a nonwoven fabric is preferably conducted by a melt blown method or a spunbonding method. The melt blown method or the spunbonding method is advantageous because these methods can produce a nonwoven fabric including an ultrafine fiber in a relatively easy manner and can conduct solvent-free spinning to minimize environmental impact.

In the melt blown method, the spinning apparatus to be used may be a conventionally known meltblowing apparatus and the spinning conditions preferably include a spinning temperature ranging from 350 to 440° C., a heated-air temperature (initial air temperature) ranging from 360 to 450° C., and an amount of air per 1 m of nozzle length ranging from 5 to 50 Nm³.

In the spunbonding method, the spinning apparatus to be used may be a conventionally known spunbonding apparatus and the spinning conditions preferably include a spinning temperature ranging from 350 to 440° C., a heated-air temperature (air temperature for stretching) ranging from 360 to 450° C., and a rate of air for stretching ranging from 500 to 5000 m/minute.

The electrically charged nonwoven fabric of the present invention may be produced by three-dimensional entanglement through techniques of spunlace, needle punching, and steamjet.

The method of electrically charging the nonwoven fabric is not particularly limited and may be a known, appropriate electret treatment technique such as a technique that involves rubbing or touching the fabric to impart an electric charge to the fabric, a technique involving irradiation of an active energy ray (such as electron beam, ultraviolet light, or X ray), a technique involving electrical discharge in gas (such as corona discharge or plasma discharge), a technique involving a high electric field, or a technique involving hydro-charging using a polar solvent such as water. For achieving a high degree of electrical charging of the resulting electrically charged nonwoven fabric of the present invention using a relatively small amount of electricity, it is preferable that the electrical charging is conducted by at least one method of a corona discharge method and a hydro-charging method.

The apparatus and the conditions employed in the corona discharge method are not particularly limited, and conventionally known apparatus and the conditions may be used. For example, it is preferable that a direct-current high-voltage stable power supply (manufactured by Kasuga Electric Works Ltd.) is used to apply a voltage within the range from −50 to −10 kV and/or from 10 to 50 kV (more preferably from −40 to −20 kV and/or from 20 to 40 kV) to electrodes that are disposed at a linear interval within the range from 5 to 70 mm (more preferably from 10 to 30 mm), for example, at a temperature within the range from normal temperature (20° C.) to 100° C. (more preferably from 30 to 80° C.) for a duration within the range from 0.1 to 20 seconds (more preferably from 0.5 to 10 seconds).

The apparatus and the conditions employed in the hydro-charging method are not particularly limited, and conventionally known apparatus and the conditions may be used. For example, charging in this method is conducted by spraying a polar solvent such as water or an organic solvent (preferably water, from the viewpoint of drainage and other productivity aspects) at the nonwoven fabric or vibrating the polar solvent. The pressure at which the polar solvent is smashed into the nonwoven fabric is preferably within the range from 0.1 to 5 MPa (more preferably from 0.5 to 3 MPa). The pressure of suction from the bottom is within the range from 500 to 5000 mmH$_2$O (more preferably from 1000 to 3000 mmH$_2$O). The duration of suction hydro-charging preferably ranges from 0.01 to 5 seconds (more preferably from 0.02 to 1 second). After the hydro-charging method is conducted, the resulting electrically charged nonwoven fabric is preferably dried at a temperature within the range from 40 to 100° C. (more preferably from 50 to 80° C.).

For enhancing the effect of the electrically charged state, the electrically charged nonwoven fabric of the present invention may further contain a nonconductive fiber in addition to the fiber predominantly composed of an amorphous polymer. The nonconductive state herein refers to a state that preferably has a specific volume resistance of greater than or equal to $10^{12}$ Ω·cm, more preferably greater than or equal to $10^{14}$ Ω·cm. The specific volume resistance is measured in accordance with ASTM D257. The content of the nonconductive fiber in the nonwoven fabric is preferably within the range from 0 to 10% by weight. Compared to an electrically charged nonwoven fabric containing no nonconductive fiber, the electrically charged nonwoven fabric thus containing the nonconductive fiber can retain a great amount of electric charge and is thereby suitable for a filtration material having excellent collection performances and low pressure loss. Examples of a raw material of the nonconductive fiber include polyolefins such as polyethylene and polypropylene, polyesters such as polyethylene terephthalate, polytrimethylene terephthalate, polybutylene terephthalate, and polylactic acid, polycarbonates, polystyrene, polyphenylene sulfide, fluororesins, and copolymers and mixtures of these.

The present invention also provides a method for suitably producing the electrically charged nonwoven fabric of the present invention described above. The method for producing electrically charged nonwoven fabric of the present invention includes forming a nonwoven fabric by a melt blown method or a spunbonding method using the fiber predominantly composed of an amorphous polymer and electrically charging the resulting nonwoven fabric by at least one method of a corona discharge method and a hydro-charging method. The electrically charged nonwoven fabric of the present invention may be produced either by the method for producing electrically charged nonwoven fabric of the present invention, or by other methods, but one produced by the method for producing electrically charged nonwoven fabric of the present invention is preferable. Preferable conditions for the melt blown method, the spunbonding method, the corona discharge method, and the hydro-charging method are as described above.

EXAMPLES

The present invention will be specifically described by way of examples. The present invention, however, is not limited to these examples.

[Average Fiber Diameter (μm)]

A photo of a nonwoven fabric was taken with a scanning electron microscope under magnification. Diameters of any 100 fibers of the nonwoven fabric were measured, and the average value of these diameters was defined as an average fiber diameter.

[Thickness of Nonwoven Fabric (μm)]

A continuous-fiber nonwoven fabric was produced and then allowed to leave in a standard environment (temperature, 20° C.; relative humidity, 65%) for a duration of greater than or equal to 4 hours, followed by measurement of its thickness at five positions with a PEACOCK Dial-Thickness Gauge H Type (manufactured by YASUDA SEIKI SEISAKUSHO, LTD., φ10 mm×180 g/cm$^2$). The average value of the resulting measurements was defined as the thickness of the nonwoven fabric.

[Basis Weight of Nonwoven Fabric (g/m$^2$)]

Measurement was conducted in accordance with JIS P 8124.

[Density of Nonwoven Fabric (g/cm$^3$)]

The value of the [thickness of nonwoven fabric] and the value of the [basis weight of nonwoven fabric] were used to determine the volume of the nonwoven fabric. All of these values were used to calculate the density of the nonwoven fabric.

[Air Permeability of Nonwoven Fabric (cc/cm$^2$/sec)]

Measurement was conducted by the Frajour method in accordance with JIS L 1913 "Test methods for nonwovens", the section of air permeability.

[Flame Retardancy]

By the test method in accordance with JIS A 1322, a specimen disposed at 45° was heated at its bottom for 10 seconds with a Meker burner that was disposed 50 mm away from the bottom of the specimen. The length of the resulting charred part was measured, followed by evaluation of flame retardancy based on the following criteria.

a: The length of the charred part was less than 5 cm.

b: The length of the charred part was greater than or equal to 5 cm.

[Surface Charge Density]

In accordance with the standard of JIS L 1094, a test piece of 5 cm×5 cm was cut out of the nonwoven fabric obtained and then subjected to measurement of the amount of electric charge with a Faraday cage (static meter KQ431B) manufactured by Kasuga Electric Works Ltd. The resulting measurement was divided by the area of the specimen, 25 cm$^2$, to obtain the value of surface charge density (coulomb/cm$^2$).

[Collection Efficiency]

In accordance with JIS T 8151, a fragment of a size of 11 cmφ was cut out of the nonwoven fabric and then fixed on a specimen platform having an 8.6-cmφ filtration part (filtration area, 58.1 cm$^2$). Filtration of quartz dust particles (average particle diameter, 1 μm) was conducted under conditions of a volume of air of 30 L/minute and a fabric-passing velocity of 8.6 cm/second, and the value of collection efficiency (%) was measured. The decrement of collection efficiency was determined by math formula:

Decrement=((initial collection efficiency)−(collection efficiency after being allowed to leave at 100° C. for 24 hours))/(initial collection efficiency)× 100.

[Pressure Loss]

In accordance with JIS T 8151, a fragment of a size of 11 cmφ was cut out of the nonwoven fabric and then fixed on a specimen platform having an 8.6-cmφ filtration part (filtration area, 58.1 cm$^2$). Filtration of quartz dust particles (average particle diameter, 1 μm) was conducted under conditions of a volume of air of 30 L/minute and a fabric-passing velocity of 8.6 cm/second, and the value of pressure loss (Pa) was measured.

[Collection Efficiency and Pressure Loss after being Allowed to Leave at 100° C. for 24 Hours]

After being allowed to leave at 100° C. for 24 hours, the nonwoven fabric obtained was subjected to measurement of collection efficiency and pressure loss as described above.

[QF Value]

The values of collection efficiency and pressure loss thus measured at the initial state and after being allowed to leave at 100° C. for 24 hours were substituted into formula:

−ln(1−(collection efficiency (%))/100)/(pressure loss (Pa))

to obtain an initial QF value and a QF value after being allowed to leave at 100° C. for 24 hours.

Example 1

An amorphous polyetherimide (glass transition temperature, 215° C.) was spun at a spinning temperature of 420° C. into a melt-blown nonwoven fabric that had a basis weight of 25 g/m$^2$ and an average fiber diameter of 2.2 μm. Subsequently, calender treatment was conducted at a roll temperature of 200° C. and a contact pressure of 30 kg/cm, followed by voltage application with a direct-current high-voltage stable power supply (manufactured by Kasuga Electric Works Ltd.) by the corona discharge method under conditions of a distance between electrodes of 20 mm, a voltage of 30 kV, a temperature of 30° C., and a duration of 3 seconds. Physical properties of the resulting electrically charged nonwoven fabric are shown in Table 1.

Example 2

An amorphous polyetherimide (glass transition temperature, 215° C.) was spun at a spinning temperature 435° C. into a spunbonding nonwoven fabric that had a basis weight of 25 g/m$^2$ and an average fiber diameter of 5.1 μm. Subsequently, calender treatment was conducted at a roll temperature of 200° C. and a contact pressure of 30 kg/cm, followed by voltage application with a direct-current high-voltage stable power supply (manufactured by Kasuga Electric Works Ltd.) by the corona discharge method under conditions of a distance between electrodes of 20 mm, a voltage of 30 kV, a temperature of 30° C., and a duration of 3 seconds. Physical properties of the resulting electrically charged nonwoven fabric are shown in Table 1.

Example 3

An amorphous polyetherimide (glass transition temperature, 215° C.) was spun at a spinning temperature of 420° C. into a melt-blown nonwoven fabric that had a basis weight of 25 g/m$^2$ and an average fiber diameter of 2.5 μm. Subsequently, calender treatment was conducted at a roll temperature of 200° C. and a contact pressure of 80 kg/cm, followed by voltage application with a direct-current high-voltage stable power supply (manufactured by Kasuga Electric Works Ltd.) by the corona discharge method under conditions of a distance between electrodes of 20 mm, a voltage of 30 kV, a temperature of 30° C., and a duration of 3 seconds. Physical properties of the resulting electrically charged nonwoven fabric are shown in Table 1.

Example 4

An amorphous polycarbonate (PC) (glass transition temperature, 145° C.) was spun at a spinning temperature of 350° C. into a melt-blown nonwoven fabric that had a basis weight of 25 g/m$^2$ and an average fiber diameter of 5.4 μm. Subsequently, calender treatment was conducted at a roll temperature of 100° C. and a contact pressure of 30 kg/cm, followed by voltage application with a direct-current high-voltage stable power supply (manufactured by Kasuga Electric Works Ltd.) by the corona discharge method under conditions of a distance between electrodes of 20 mm, a voltage of 30 kV, a temperature of 30° C., and a duration of 3 seconds. Physical properties of the resulting electrically charged nonwoven fabric are shown in Table 1.

Comparative Example 1

In accordance with ASTM D 1238, a polypropylene (glass transition temperature, 0° C.) having a melt flow rate (MFR) of 1100 g/10 minutes measured at a temperature of 230° C. and a load of 2.16 kg was spun at a spinning temperature of 280° C. into a melt-blown nonwoven fabric that had a basis weight of 25 g/m$^2$ and an average fiber diameter of 3.1 Subsequently, voltage application was conducted with a direct-current high-voltage stable power supply (manufactured by Kasuga Electric Works Ltd.) by the corona discharge method under conditions of a distance between electrodes of 20 mm, a voltage of 30 kV, a temperature of 30° C., and a duration of 3 seconds. Physical properties of the resulting electrically charged nonwoven fabric are shown in Table 1.

Comparative Example 2

The same procedure as in Example 1 was conducted except that the corona discharge method was not implemented. Physical properties of the resulting nonwoven fabric are shown in Table 1.

TABLE 1

| | Example 1 | Example 2 | Example 3 | Example 4 | Comparative Example 1 | Comparative Example 2 |
|---|---|---|---|---|---|---|
| Raw material constituting nonwoven fabric | | | | | | |
| Polymer composition of fiber | PEI | PEI | PEI | PC | PP | PEI |
| Glass transition temperature of amorphous polymer (° C.) | 215 | 215 | 215 | 145 | 0 | 215 |
| Constitution of continuous-fiber nonwoven fabric | | | | | | |
| Configuration of continuous-fiber nonwoven fabric | Melt blown | Spun-bonding | Melt blown | Melt blown | Melt blown | Melt blown |
| Spinning temperature (° C.) | 420 | 435 | 420 | 350 | 280 | 420 |
| Average fiber diameter of nonwoven fabric (μm) | 2.2 | 5.1 | 2.5 | 5.4 | 3.1 | 2.2 |
| Basis weight of nonwoven fabric (g/m$^2$) | 25 | 25 | 25 | 25 | 25 | 25 |
| Air permeability of nonwoven fabric (cc/cm$^2$/sec) | 60 | 124 | 35 | 70 | 60 | 60 |
| Thickness of nonwoven fabric (μm) | 173 | 215 | 105 | 165 | 200 | 173 |
| Density of nonwoven fabric (g/cm$^3$) | 0.145 | 0.116 | 0.238 | 0.152 | 0.125 | 0.145 |
| Electrical charging treatment | Yes | Yes | Yes | Yes | Yes | No |
| Surface charge density (coulomb/cm$^2$) | $3.5 \times 10^{-10}$ | $2.9 \times 10^{-10}$ | $3.3 \times 10^{-10}$ | $3.6 \times 10^{-10}$ | $3.3 \times 10^{-10}$ | $1.1 \times 10^{-11}$ |
| Filter performances | | | | | | |
| Collection efficiency (%) | 90 | 80 | 95 | 84 | 91 | 55 |
| Collection efficiency (%) after being allowed to leave at 100° C. for 24 hours | 86 | 76 | 90 | 79 | 73 | 55 |

TABLE 1-continued

| | Example 1 | Example 2 | Example 3 | Example 4 | Comparative Example 1 | Comparative Example 2 |
|---|---|---|---|---|---|---|
| Decrement of collection efficiency | 4.4 | 5.0 | 5.3 | 6.0 | 19.8 | 0 |
| Pressure loss (Pa) | 17 | 10 | 40 | 15 | 16 | 17 |
| Pressure loss (Pa) after being allowed to leave at 100° C. for 24 hours | 17 | 10 | 40 | 15 | 16 | 17 |
| Flame retardancy | a | a | a | b | b | a |
| Initial QF value | 0.135 | 0.161 | 0.075 | 0.122 | 0.150 | 0.047 |
| QF value after being allowed to leave at 100° C. for 24 hours | 0.116 | 0.143 | 0.058 | 0.104 | 0.082 | 0.047 |

All the embodiments and examples disclosed herein are provided merely for illustrative purposes and are not limitative in all respects. The scope of the present invention is defined not by the description above but by the claims. All the modifications equivalent to the claims and within the range of definition made by the claims are encompassed by the scope of the present invention.

The invention claimed is:

1. An electrically charged nonwoven fabric comprising a fiber predominantly comprising an amorphous polymer, wherein a QF value of the electrically charged nonwoven fabric is greater than or equal to 0.1.

2. The electrically charged nonwoven fabric according to claim 1, wherein the electrically charged nonwoven fabric has a surface charge density of greater than or equal to $1 \times 10^{-10}$ coulomb/cm$^2$.

3. The electrically charged nonwoven fabric according to claim 1, wherein the electrically charged nonwoven fabric has a collection efficiency for collecting a dust particle with a particle diameter of 1 μm flowing at a fabric-passing velocity of 8.6 cm/second of greater than or equal to 40%.

4. The electrically charged nonwoven fabric according to claim 3, wherein the decrement of the dust-particle collection efficiency after being allowed to leave at 100° C. for 24 hours is less than or equal to 20%.

5. The electrically charged nonwoven fabric according to claim 1, wherein the amorphous polymer has a glass transition temperature of greater than or equal to 200° C.

6. The electrically charged nonwoven fabric according to claim 1, wherein the amorphous polymer is an amorphous polyetherimide.

7. The electrically charged nonwoven fabric according to claim 6, wherein a weight average molecular weight (Mw) of the amorphous polyetherimide is from 1000 to 80000.

8. The electrically charged nonwoven fabric according to claim 6, wherein a weight average molecular weight (Mw) of the amorphous polyetherimide is from 2000 to 50000.

9. The electrically charged nonwoven fabric according to claim 6, wherein a weight average molecular weight (Mw) of the amorphous polyetherimide is from 3000 to 40000.

10. The electrically charged nonwoven fabric according to claim 6, wherein the amorphous polyetherimide is a condensate of 2,2-bis[4-(2,3-dicarboxyphenoxy)phenyl]propane dianhydride and m-phenylenediamine or p-phenylenediamine.

11. The electrically charged nonwoven fabric according to claim 6, wherein the fiber has an average fiber diameter from 1 to 25 μm.

12. The electrically charged nonwoven fabric according to claim 1, wherein the electrically charged nonwoven fabric has a thickness within a range from 10 to 1000 μm.

13. The electrically charged nonwoven fabric according to claim 1, produced by a melt blown method or a spunbonding method.

14. The electrically charged nonwoven fabric according to claim 13, wherein electrical charging is conducted by a corona discharge method, a hydro-charging method, or both.

15. A filtration material comprising the electrically charged nonwoven fabric according to claim 1.

16. A method for producing an electrically charged nonwoven fabric, comprising:
    forming a nonwoven fabric by a melt blown method or a spunbonding method using a fiber predominantly comprising an amorphous polymer; and
    electrically charging the resulting nonwoven fabric by a corona discharge method, a hydro-charging method, or both.

* * * * *